(12) United States Patent
Sun

(10) Patent No.: US 8,204,332 B2
(45) Date of Patent: Jun. 19, 2012

(54) METHOD AND DEVICE FOR TONE SCALE CURVE GENERATION

(75) Inventor: Wenwu Sun, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 231 days.

(21) Appl. No.: 12/822,988

(22) Filed: Jun. 24, 2010

(65) Prior Publication Data

US 2011/0002524 A1 Jan. 6, 2011

(30) Foreign Application Priority Data

Jul. 1, 2009 (CN) .......................... 2009 1 0108518

(51) Int. Cl.
*G06K 9/42* (2006.01)

(52) U.S. Cl. ...................................................... 382/260

(58) Field of Classification Search .................. 382/260, 382/167; 358/1.9
See application file for complete search history.

(56) References Cited

U.S. PATENT DOCUMENTS

| | | | |
|---|---|---|---|
| 6,791,716 B1* | 9/2004 | Buhr et al. ...................... | 358/1.9 |
| 2003/0235342 A1* | 12/2003 | Gindele ......................... | 382/260 |
| 2006/0077405 A1* | 4/2006 | Topfer et al. .................. | 358/1.9 |

FOREIGN PATENT DOCUMENTS

| | | |
|---|---|---|
| CN | 1162363 A | 10/1997 |
| CN | 101231747 A | 7/2008 |
| EP | 0422220 B1 | 7/1996 |
| EP | 0887773 A3 | 2/2000 |
| EP | 0725311 B1 | 6/2004 |
| JP | 20023215783 A | 7/2003 |

* cited by examiner

*Primary Examiner* — Claire X Wang

(74) *Attorney, Agent, or Firm* — Kory D. Christensen; Stoel Rives LLP

(57) ABSTRACT

A method and device for generating an adaptive image tone scale curve and an image processing system including the device are provided. The method may include determining an abscissa and an ordinate of a reference control point and a reference slope of a curve passing the reference control point according to an image of different tissue sites and/or different orientations depending upon one or more practical requirements; calculating an average value of pixels in an area of interest in the image and using the average value as a current image feature value; constructing an S-shaped reference tone scale curve equation by using the coordinates of the reference control point and the reference slope; and substituting coordinates of a new control point and a slope of a curve passing the new control point into the S-shaped reference tone scale curve equation to calculate parameters therein, so as to obtain the adaptive image tone scale curve.

14 Claims, 5 Drawing Sheets

METHOD AND DEVICE FOR TONE SCALE CURVE GENERATION

CROSS-REFERENCE TO RELATED APPLICATIONS

This application claims the benefit of Chinese Patent Application No. 200910108518.6, filed on Jul. 1, 2009, which is incorporated herein by reference in its entirety.

TECHNICAL FIELD

This application relates to an image processing method and device, and more particularly, to a method and device for generating a tone scale curve of an image

DETAILED DESCRIPTION

Figure 1:
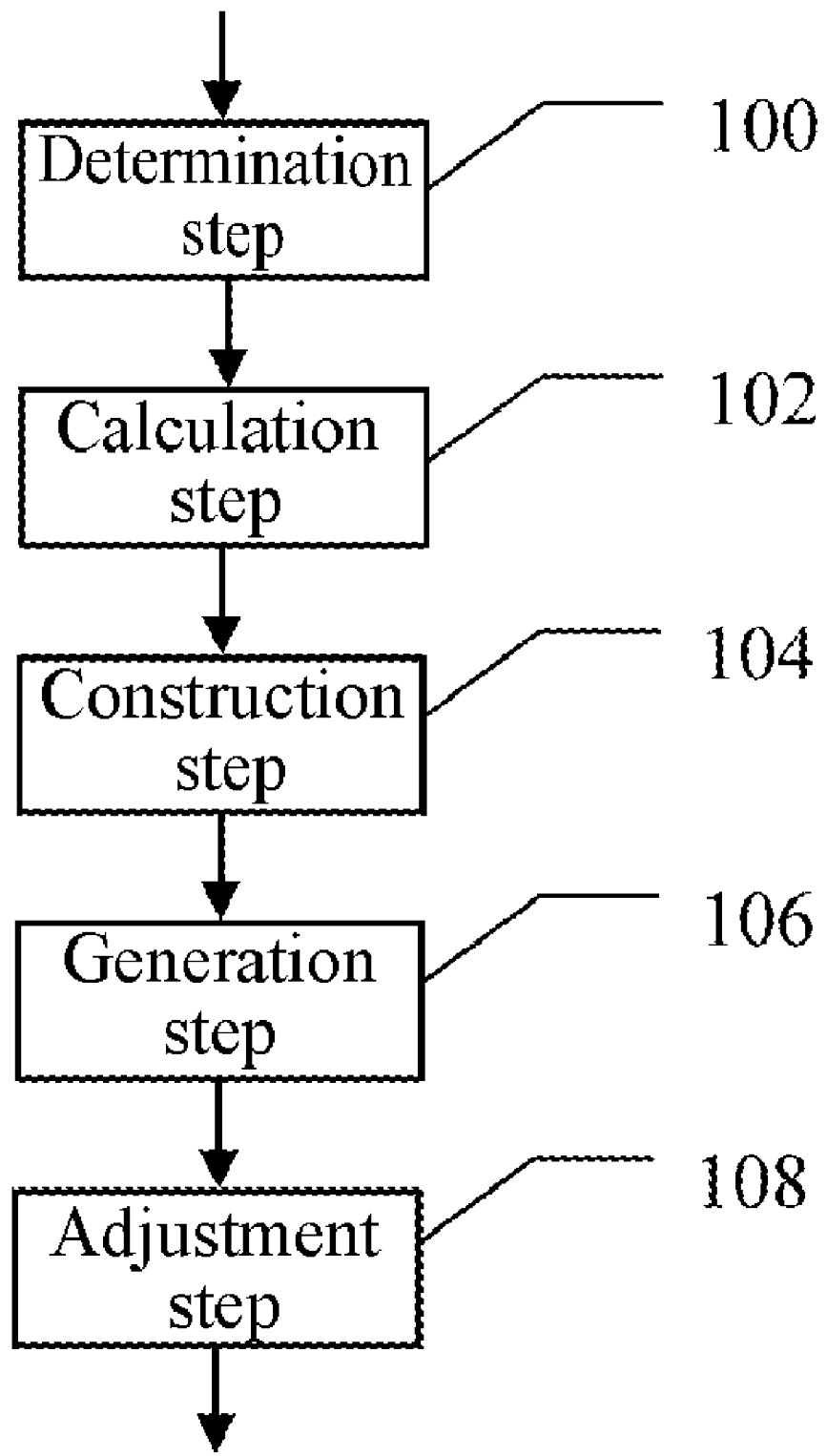
FIG. 1 is a flow chart of a method for generating an adaptive image tone scale curve.

Raw image data obtained by digital X-ray imaging equipment has a wide dynamic range. Currently, standard X-ray imaging equipment is generally capable of capturing a 14-bit data range. If all tissue information corresponding to the entire data range is displayed, the contrast between tissues becomes very low, making it difficult to use in clinical applications.

On the other hand, in practical diagnosis, a data range corresponding to a tissue area of interest only accounts for a portion of the entire data range. In order to increase the contrast between tissues in the area of interest, the width and level of a window for displaying the image are adjusted, so as to make a particular tissue area have a certain contrast. However, at the same time, other tissue areas become invisible, thereby reducing the diversity of the tissue information that can be simultaneously displayed. Therefore, a series of post-processing operations must be performed on the image before the image is provided to the doctor for diagnosis.

One such operation is to establish a tone scale curve for transforming the image, which can influence the overall display effect of the image. After the image is transformed by using the tone scale curve, the contrast of the particular tissue area can be improved. At the same time, the information of other areas can also be displayed.

In order to establish the tone scale curve, the current image needs to be analyzed, so as to extract some feature values of the image. In current X-ray imaging equipment, the image analysis process is complex, and the accuracy of the result of analysis influences the quality of the image. For example, according to one conventional approach, four feature points of the image are determined by analyzing the range of the area of interest of the image and an active histogram of the image, and then the tone scale curve of the image is generated by using a model method. In another conventional approach, an S-curve general expression is used, so as to generate a set of curves with different contrasts. However, the curve generation in this method is not adaptive to the current image features. Therefore, it is necessary to provide a simple and effective method for generating an image tone scale curve.

In one embodiment, a device for generating an adaptive image tone scale curve includes a determination module, for determining an abscissa and an ordinate of a reference control point and a reference slope of a curve passing the reference control point according to an image of different tissue sites and/or different orientations depending upon one or more practical requirements. The device may also include a calculation module, for calculating an average value of pixels in an area of interest in the image and using the average value as a current image feature value.

The device may further include a construction module, for constructing an S-shaped reference tone scale curve equation by using the coordinates of the reference control point and the reference slope, and a generation module, for substituting coordinates of a new control point and a slope of a curve passing the new control point into the S-shaped reference tone scale curve equation to calculate parameters therein, so as to obtain the adaptive image tone scale curve.

The tone scale curve generated according to the present disclosure is adaptive to different features of the image, can be generated through a simple method, and requires a small amount of calculation.

Various methods and devices are described in further detail below through specific embodiments with reference to the accompanying drawings.

FIG. 1 is a flow chart of a method for generating an adaptive image tone scale curve according to an embodiment of the present disclosure. Referring to FIG. 1, the method may include a determination step 100, a calculation step 102, a construction step 104 and a generation step 106, and optionally an adjustment step 108. In the determination step 100, an abscissa and an ordinate of a reference control point and a reference slope of a curve passing the reference control point are determined according to an image of different tissue sites and/or different orientations depending upon one or more practical requirements. A value of the abscissa may be an average pixel value in an area of interest in a large number of images of the same site and orientation. The ordinate is dependent on a maximum value $I_{max}$ and a minimum value $I_{min}$ of an output of a reference tone scale curve, and generally has a value between $$\frac{I_{max} + I_{min}}{2} \text{ and } \frac{I_{max} + I_{min}}{2} + (I_{max} - I_{min}) \times 0.3.$$

The reference slope generally has a value range of 0 to 2.0 (but is not limited to this range), and usually has a value of 1.0 or 1.5.

In the calculation step 102, an average value of pixels in an area of interest in the image is calculated and used as a current image feature value. In the construction step 104, an S-shaped reference tone scale curve equation is constructed by using the coordinates of the reference control point and the reference slope. In the generation step 106, coordinates of a new control point and a slope of a curve passing he new control point are substituted into the S-shaped reference tone scale curve equation to calculate parameters therein, so as to obtain an adaptive image tone scale curve. In the adjustment step 108, shapes of two ends of the tone scale curve are adjusted, so as to change contrasts of two ends of a dynamic range of the image. The steps of a method according to this embodiment are described in detail below.

Initially, the area of interest in the image is segmented so as to extract features of the area of interest. According to different irradiated tissue sites, the area of interest may be a particular area such as a lung lobe, or the entire tissue area of the irradiated site. Definition and calculation of the features of the area of interest vary with different methods for generating the tone scale curve. In this embodiment, an average pixel value of a part of pixels having a pixel value within a certain range in the area of interest is used as a feature value of the area of interest. After the image is segmented and analyzed, a tone scale curve suitable for the current image is further generated by using the calculated feature value. For the sake of convenience, before the tone scale curve of the current image is generated, a reference tone scale curve is constructed in advance in this embodiment for a type of images having the same irradiated site and orientation. The shape of the reference tone scale curve is dependent on a position of a reference control point that the curve passes and a reference slope of the curve at the position. A universal function of the curve is as follows:

$$f = f(x_0, y_0, g) \quad (1)$$

where x0 and y0 are respectively an abscissa and an ordinate of the reference control point, and g is the reference slope of the curve passing the reference control point.

Many methods may be used to construct a curve passing the reference control point and having a slope identical to the reference slope at the position. A common method is to construct an S-curve. The S-curve is characterized in that the slope is large in a middle segment while small at two ends. The pixel values corresponding to the area of interest of the image are transformed by using a function of the large-slope segment in the S-curve, and the pixel values corresponding to areas not of interest of the image are transformed by using a function of the small-slope segment in the S-curve, so as to increase the contrast between tissues in the area of interest and suppress the contrast of the tissues in the areas not of interest. A method for constructing the S-curve is as follows:

$$I_{out} = I_{min} + \frac{I_{max} - I_{min}}{1 + c^{\beta \cdot (I_0 - I)}} \quad (2)$$

where I is an independent variable of the curve and is corresponding to an input pixel value of the image, $I_{out}$ is corresponding to an output pixel value of the image, $I_{max}$ and $I_{min}$ are respectively a maximum value and a minimum value of $I_{out}$, $\beta$ and $I_0$ are two parameters dependent on the position coordinates of the current control point and the slope, and c is any real number greater than 1, for example, 10 (it should be noted that any value of c can be converted into the case that c is 10, and the difference is that $\beta$ has different corresponding values).

Given the position coordinates $(I_b, I_{out}^b)$ of the reference control point and the reference slope $g_b$, a method for calculating the parameters $\beta$ and $I_0$ corresponding to the reference control point in Equation (2) is:

assuming that $$\alpha = \frac{I_{max} - I_{min}}{I_{out}^b - I_{min}} - 1, \quad (3)$$

then $$\beta = \frac{g_b \cdot (1 + \alpha)^2}{(I_{max} - I_{min}) \cdot \alpha \cdot \ln(c)}, \quad (4)$$

$$I_0 = I_b + \frac{\log_c \alpha}{\beta}. \quad (5)$$

Figure 2:
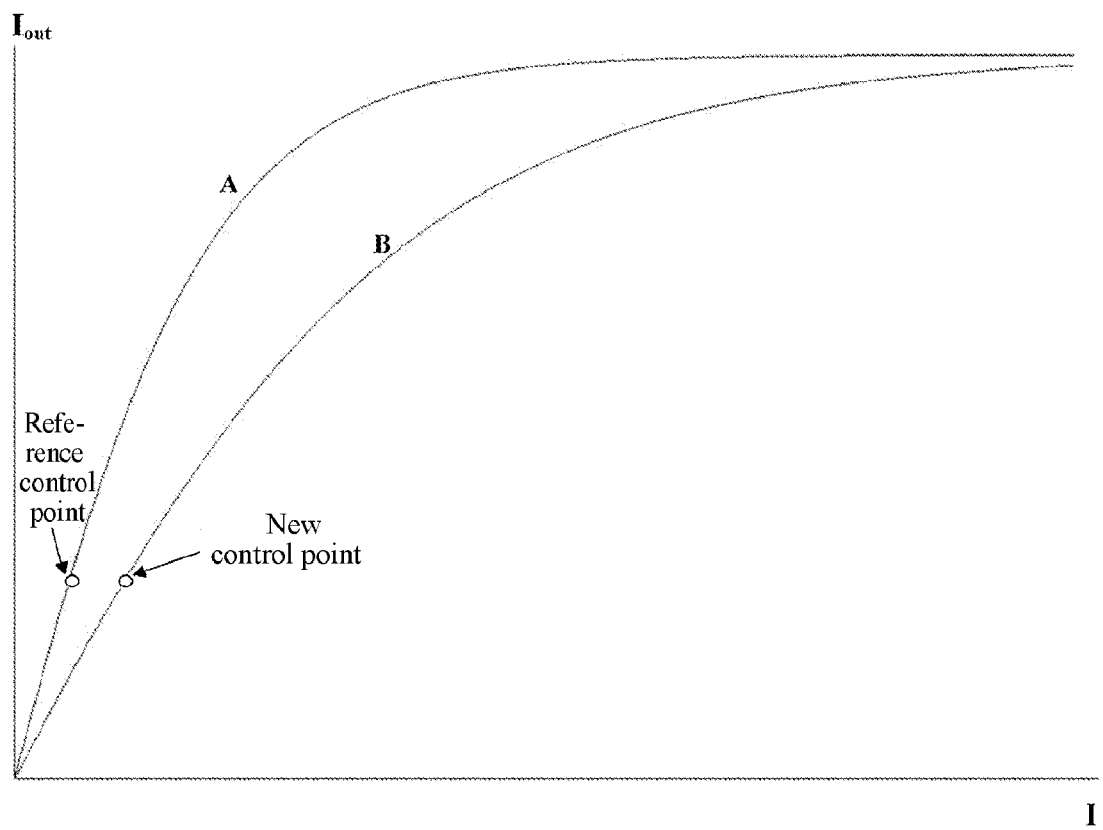
FIG. 2 is a schematic view of a reference tone scale curve and a tone scale curve adaptive to a current image.

A schematic view of the reference tone scale curve is as shown by Curve A in FIG. 2.

Another method for constructing the S-curve is as follows:

$$I_{out} = I_{min} + \frac{I_{max} - I_{min}}{1 + r \cdot e^{-t \cdot I}} \quad (6)$$

where r and t are two parameters dependent on the position of the current control point and the slope of the curve passing the point, $I_{max}$, $I_{min}$, $I_{out}$ and I are as defined in Equation (2). Given the position coordinates $(I_b, I_{out}^b)$ of the reference control point and the reference slope $g_b$, through the following simultaneous equations in two unknowns, $$\begin{cases} I_{out}^b = I_{out}(I_b) \\ g_b = I'_{out}(I)|_{I=I_b} \end{cases} \quad (7)$$

it is possible to solve values of the parameters r and t corresponding to the reference control point in Equation (6).

Both Equations (2) and (6) construct an S-shaped function through an exponential function. However, in practice, a trigonometric function may also be use to construct the following S-shaped curve:

$$I_{out} = I_{min} + \frac{I_{max} - I_{min}}{2} \left\{ 1 + \frac{1}{\sin(p\frac{\pi}{2})} \sin\left[ p\pi\left(\frac{I}{I_{max}} - q\right) \right] \right\} \quad (8)$$

where p and q are two parameters dependent on the position coordinates of the current control point and the slope of the curve passing the point, p and q vary in a range from 0 to 1, and $I_{max}$, $I_{min}$, $I_{out}$ and I are as defined in Equation (6). Similar to the method for solving the parameters r and t in Equation (6), the values of the parameters p and q can be solved. For the image of different tissue sites and orientations, the corresponding coordinates $(I_b, I_{out}^b)$ of the reference control point and the corresponding reference slope $g_b$ for constructing the reference tone scale curve also vary, that is, corresponding adjustment is performed according to practical requirements (for example, contrast and brightness requirements) of the image of the site.

In order to further generate a tone scale curve adaptive to the current image, in this embodiment, coordinates of a new control point and a slope of an adaptive curve passing the point are generated by changing the position of the reference control point and the slope of the reference tone scale curve passing the point, and the current adaptive tone scale curve is generated as the above generation method of the reference tone scale curve. That is to say, if the reference tone scale curve is generated by using Equation (2), the position of the new control point and the slope of the calculated adaptive curve are substituted into Equation (2) again to calculate the new parameters β and $I_0$, so as to obtain the adaptive tone scale curve. If the reference tone scale curve is generated by using Equation (6) or (8), the adaptive tone scale curve can also be obtained through similar calculations.

An abscissa of the new control point is the current image feature value T multiplied by a coefficient k greater than zero. Here, k is a coefficient greater than zero, and has a value of, for example, 0.5, and the value of the coefficient should make the value of the abscissa of the new control point fall within a data range of the area of interest. An ordinate of the new control point is same as the ordinate of the reference control point. Hence, the position coordinates of the new control point are:

$$(k*T, I_{out}{}^b).$$

The slope of the adaptive tone scale curve passing the new control point is the reference slope $g_b$ multiplied by a ratio of the abscissa Ib of the reference control point to the image feature value T. Assuming that $$Y = \frac{I_b}{T},$$

the slope of the adaptive tone scale curve passing the new control point is: $Y*g_b$.

Through this method, the pixel values corresponding to the area of interest of the current image can be transformed by using a function of the large-slope segment in the current adaptive curve, so as to increase the contrast between tissues in the area of interest. A schematic view of the adaptive tone scale curve is as shown by Curve B in FIG. 2.

Moreover, tissue contrasts in two end areas of a dynamic range of the image can be changed by changing the shapes of two ends of the tone scale curve. For the embodiment shown by Equation (2), given that a value of the parameter slope is $g_e$, an expression of a modified tail end of the tone scale curve starting from the point on the tail end of the curve at which the slope is $g_e$ is as follows:

$$I_{out} = I_{out}(I_e) + (I - I_e) \cdot g_e, I \geq I_e$$

where $I_e$ is an abscissa of the point. A calculation method of $I_e$ is:

$$p = 2 - (I_{max} - I_{min}) \cdot \beta \cdot \frac{lna}{g_e},$$

$$q = \frac{-p - \sqrt{p^2 - 4}}{2},$$

$$I_e = I_0 - \frac{\log_a(q)}{\beta}.$$

Figure 3:
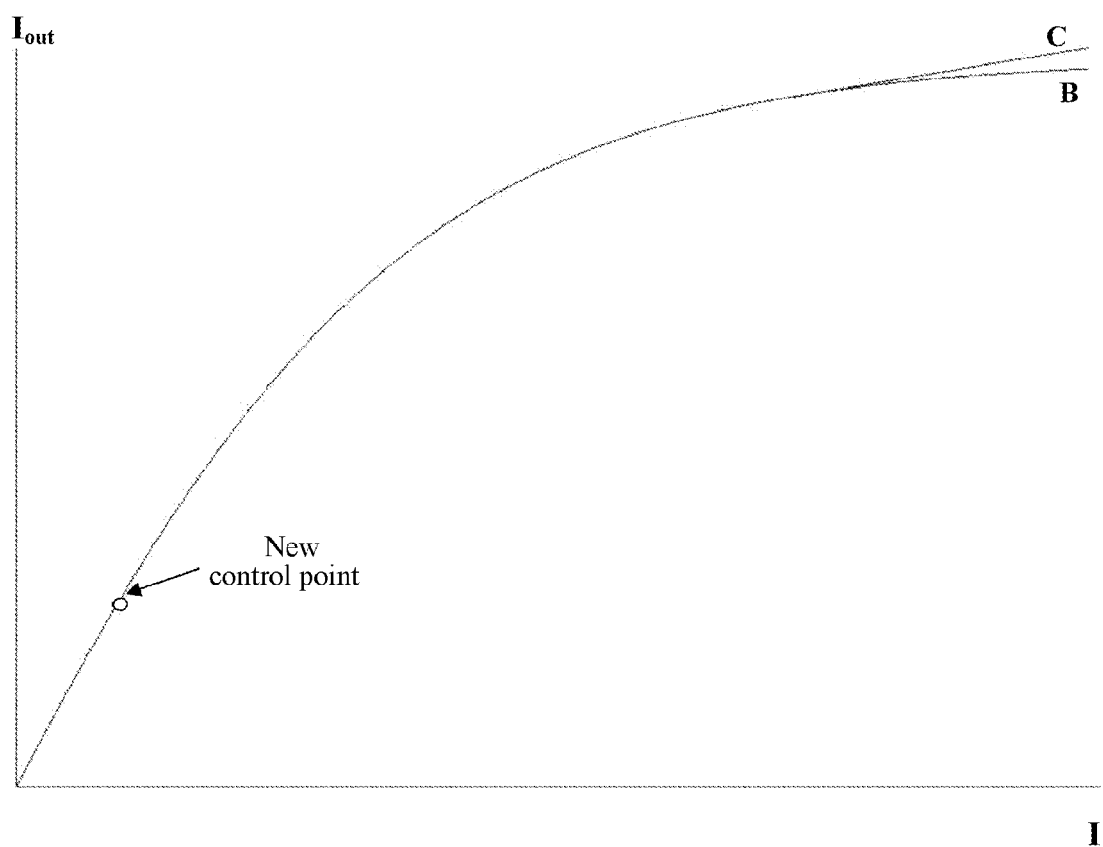
FIG. 3 is a schematic view of a shape of the tone scale curve after a tail end of the tone scale curve is changed.

A schematic view of the curve is as shown by Curve C in FIG. 3, which is obtained by changing the shape of a tail end of Curve B, and $g_e$ is 0.05.

Figure 4:
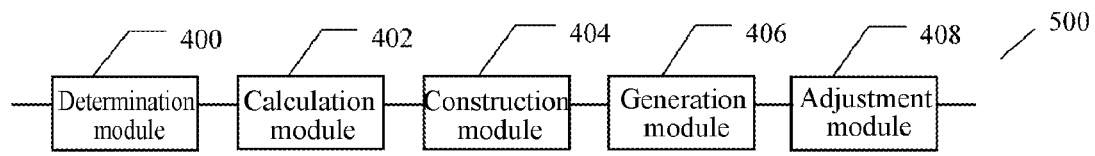
FIG. 4 is a structural block diagram of a device for generating an adaptive image tone scale curve.

FIG. 4 is a structural block diagram of a device 500 for generating an adaptive image tone scale curve according to an embodiment of the present disclosure. Referring to FIG. 4, the device may include a determination module 400, a calculation module 402, a construction module 404 and a generation module 406, and may optionally include an adjustment module 408.

The determination module 400 determines an abscissa and an ordinate of a reference control point and a reference slope of a curve passing the reference control point according to an image of different tissue sites and different orientations depending upon practical requirements. The calculation module 402 calculates an average value of pixels in an area of interest in the image and uses the average value as a current image feature value. The construction module 404 constructs an S-shaped reference tone scale curve equation by using the coordinates of the reference control point and the reference slope. The generation module 406 substitutes coordinates of a new control point and a slope of a curve passing the new control point into the S-shaped reference tone scale curve equation to calculate parameters therein, so as to obtain the adaptive image tone scale curve. The adjustment module 408 adjusts shapes of two ends of the tone scale curve, so as to change contrasts of two ends of a dynamic range of the image.

The method and device for generating an adaptive image tone scale curve according to the embodiments of the present disclosure may be implemented in image processing systems of medical imaging equipment, digital camera products and industrial and scientific instruments through hardware, software, firmware or combinations thereof, so as to transform the image. An image processing system of X-ray imaging equipment is taken as an example below to describe the application of the method and device according to the embodiments.

Figure 5:
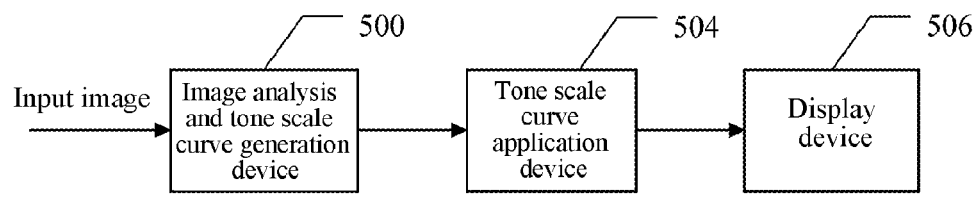
FIG. 5 shows an image post-processing system for X-ray imaging equipment that includes an image analysis and tone scale curve generation device.

An image post-processing system of X-ray imaging equipment shown in FIG. 5 includes an image analysis and tone scale curve generation device 500, a tone scale curve application device 504, and an image display device 506. The image analysis and tone scale curve generation device 500 generates a tone scale curve suitable for a current image according to the characteristics of the current image. The display device 506 performs display compensation on the image transformed by the tone scale curve application device 504, and outputs the image to a printer or display. The function of display compensation is to enable the display effect to reflect real content expressed by the image.

Figure 6:
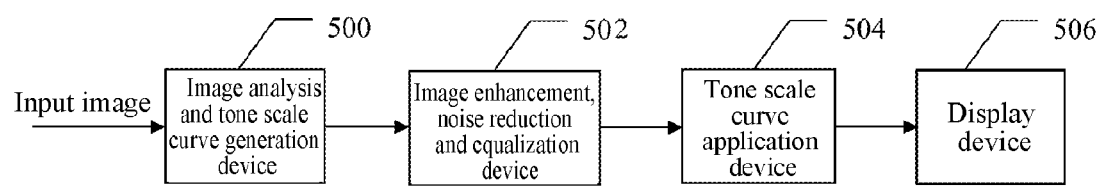
FIG. 6 shows another image post-processing system for X-ray imaging equipment that includes an image analysis and tone scale curve generation device.

FIG. 6 shows another image post-processing system of X-ray imaging equipment that includes an image analysis and tone scale curve generation device 500, which, on the basis of the system shown in FIG. 5, further includes an image enhancement, noise reduction and equalization device 502. The device 502 is used for enhancing local details of the image and suppressing noise amplification caused by the enhancement of the details, and at the same time compressing a dynamic range of the image and equalizing contrasts between details, such that more tissue information can be simultaneously displayed.

Figure 7:
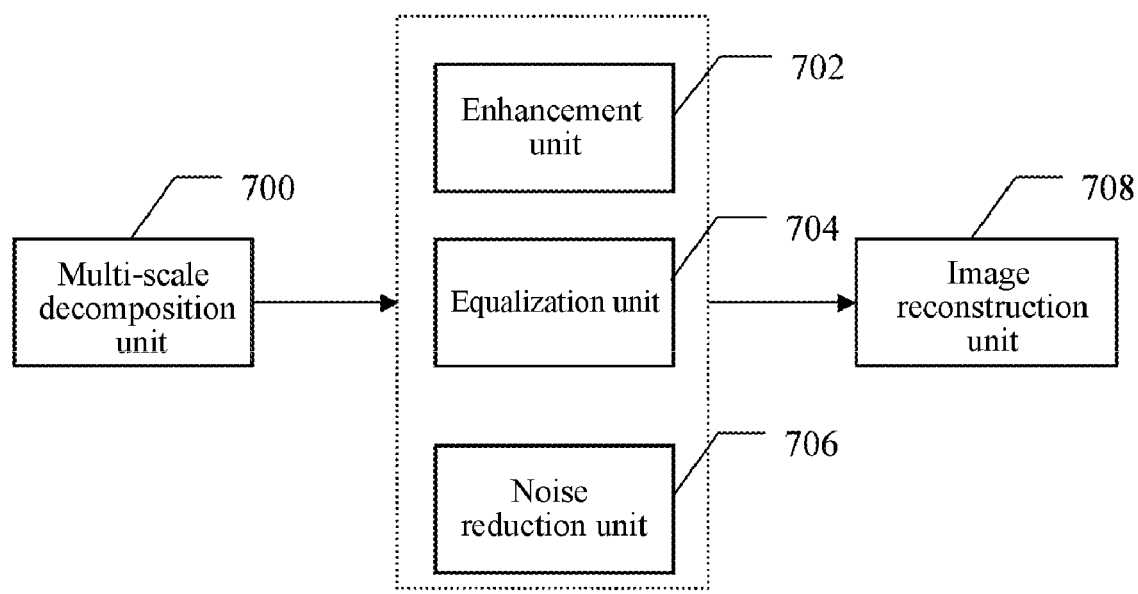
FIG. 7 is a block diagram of a system for image enhancement, noise reduction, and equalization using multi-frequency processing.

As shown in FIG. 7, image enhancement, noise reduction, and equalization generally adopt a multi-frequency processing method. A multi-scale decomposition unit 700 decomposes an input image into a series of detailed hierarchical charts with different size information, and a background chart essentially free of any detailed information. An enhancement unit 702 enhances the decomposed hierarchical details to different degrees, and noise amplification caused thereby is suppressed by a noise reduction unit 706. An equalization unit 704 compresses a dynamic range of the background chart, and equalizes contrasts between the hierarchical details, so as to enrich the information displayed simultaneously. Finally, an image reconstruction unit 708 combines the detailed hierarchical charts and the background chart after the image enhancement, noise reduction and equalization. In this embodiment, the image feature value may also be extracted in a multi-scale decomposition process of the image. In the process, the image feature value may be calculated as an average pixel value of all or a part of pixels for which noise influence is eliminated in the area of interest.

While specific embodiments and applications of various methods and devices have been illustrated and described, it is to be understood that the invention claimed hereinafter is not limited to the precise configuration and components disclosed. Various modifications, changes, and variations apparent to those of skill in the art may be made in the arrangement, operation, and details of the methods and systems disclosed.

Furthermore, the methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified without departing from the scope of the invention as claimed.

The embodiments disclosed may include various steps, which may be embodied in machine-executable instructions to be executed by a general-purpose or special-purpose computer or other electronic device. Alternatively, the steps may be performed by hardware components that contain specific logic for performing the steps, or by any combination of hardware, software, and/or firmware.

Embodiments of the present invention may also be provided as a computer program product including a non-transitory machine-readable medium having stored thereon instructions that may be used to program a computer (or other electronic device) to perform processes described herein. The machine-readable medium may include, but is not limited to, floppy diskettes, optical disks, CD-ROMs, DVD-ROMs, ROMs, RAMs, EPROMs, EEPROMs, magnetic or optical cards, or other type of media/machine-readable medium suitable for storing electronic instructions.

Those of skill in the art would further appreciate that the various illustrative logical blocks, modules, circuits, and algorithm steps described in connection with the embodiments disclosed herein may be implemented as electronic hardware, computer software, or combinations of both. To illustrate the interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the invention as claimed hereinafter.

What is claimed is:

1. An image processing method, comprising:
   determining an abscissa and an ordinate of a reference control point and a reference slope of a curve passing the reference control point according to an image of different tissue sites and/or different orientations depending upon one or more practical requirements;
   calculating an average value of pixels in an area of interest in the image and using the average value as a current image feature value;
   constructing an S-shaped reference tone scale curve equation by using the coordinates of the reference control point and the reference slope;
   substituting coordinates of a new control point and a slope of a curve passing the new control point into the S-shaped reference tone scale curve equation to calculate parameters therein, so as to obtain the adaptive image tone scale curve; and
   transforming the image using the image tone scale curve for display on a display device,
   wherein an abscissa of the new control point is the image feature value multiplied by a coefficient greater than zero, an ordinate of the new control point is the ordinate of the reference control point, and the slope of the curve passing the new control point is the reference slope multiplied by a ratio of the abscissa of the reference control point to the image feature value.

2. The method according to claim 1, further comprising:
   adjusting shapes of two ends of the tone scale curve, so as to change contrasts of two ends of a dynamic range of the image.

3. The method according to claim 1, wherein the image feature value is extracted in a multi-scale decomposition process of the image, and an average pixel value of all or a part of pixels for which noise influence is eliminated in the area of interest is used as the image feature value.

4. The method according to claim 1, wherein the practical requirements comprise one or more of brightness and contrast requirements.

5. The method according to claim 1, wherein the S-shaped reference tone scale curve equation is:

$$I_{out} = I_{min} + \frac{I_{max} - I_{min}}{1 + c^{\beta \cdot (I_0 - I)}};$$

where I is an independent variable of the curve and is corresponding to an input pixel value of the image, $I_{out}$ is corresponding to an output pixel value of the image, $I_{max}$ and $I_{min}$ are respectively a maximum value and a minimum value of $I_{out}$, $\beta$ and $I_0$ are two parameters dependent on the position coordinates of the current control point and the slope, and c is any real number greater than 1.

6. The method according to claim 1, wherein the S-shaped reference tone scale curve equation is:

$$I_{out} = I_{min} + \frac{I_{max} - I_{min}}{1 + r \cdot e^{-t \cdot I}};$$

where I is an independent variable of the curve and is corresponding to an input pixel value of the image, $I_{out}$ is corresponding to an output pixel value of the image, $I_{max}$ and $I_{min}$ are respectively a maximum value and a minimum value of $I_{out}$, and r and t are two parameters dependent on the position coordinates of the current control point and the slope.

7. The method according to claim 1, wherein the S-shaped reference tone scale curve equation is:

$$I_{out} = I_{min} + \frac{I_{max} - I_{min}}{2}\left\{1 + \frac{1}{\sin\left(p\frac{\pi}{2}\right)}\sin\left[p\pi\left(\frac{I}{I_{max}} - q\right)\right]\right\};$$

where I is an independent variable of the curve and is corresponding to an input pixel value of the image, $I_{out}$ is corresponding to an output pixel value of the image, $I_{max}$ and $I_{min}$ are respectively a maximum value and a minimum value of $I_{out}$, p and q are two parameters dependent on the position coordinates of the current control point and the slope, and p and q vary in a range from 0 to 1.

8. A device for generating an adaptive image tone scale curve, comprising:
- a determination module, for determining an abscissa and an ordinate of a reference control point and a reference slope of a curve passing the reference control point according to an image of different tissue sites and/or different orientations depending upon one or more practical requirements;
- a calculation module, for calculating an average value of pixels in an area of interest in the image and using the average value as a current image feature value;
- a construction module, for constructing an S-shaped reference tone scale curve equation by using the coordinates of the reference control point and the reference slope; and
- a generation module, for substituting coordinates of a new control point and a slope of a curve passing the new control point into the S-shaped reference tone scale curve equation to calculate parameters therein, so as to obtain the adaptive image tone scale curve;
- wherein an abscissa of the new control point is the image feature value multiplied by a coefficient greater than zero, an ordinate of the new control point is the ordinate of the reference control point, and the slope of the curve passing the new control point is the reference slope multiplied by a ratio of the abscissa of the reference control point to the image feature value.

9. The device according to claim 8, further comprising:
- an adjustment module, for adjusting shapes of two ends of the tone scale curve, so as to change contrasts of two ends of a dynamic range of the image.

10. The device according to claim 8, wherein the practical requirements comprise one or more of brightness and contrast requirements.

11. An image processing system, comprising:
- a determination module, for determining an abscissa and an ordinate of a reference control point and a reference slope of a curve passing the reference control point according to an image of different tissue sites and/or different orientations depending upon one or more practical requirements;
- a calculation module, for calculating an average value of pixels in an area of interest in the image and using the average value as a current image feature value;
- a construction module, for constructing an S-shaped reference tone scale curve equation by using the coordinates of the reference control point and the reference slope;
- a generation module, for substituting coordinates of a new control point and a slope of a curve passing the new control point into the S-shaped reference tone scale curve equation to calculate parameters therein, so as to obtain the adaptive image tone scale curve; and
- a tone scale curve application device, for transforming the image by using the tone scale curve,
- wherein an abscissa of the new control point is the image feature value multiplied by a coefficient greater than zero, an ordinate of the new control point is the ordinate of the reference control point, and the slope of the curve passing the new control point is the reference slope multiplied by a ratio of the abscissa of the reference control point to the image feature value.

12. The system according to claim 11, further comprising:
- a display device, for performing display compensation on the transformed image, and outputting the image to a printer or display.

13. The system according to claim 11, further comprising:
- an image enhancement, noise reduction and equalization device, for enhancing local details of the image before the image is transformed and suppressing noise amplification caused by the enhancement of the details, and at the same time compressing a dynamic range of the image and equalizing contrasts between details.

14. A non-transitory, computer-readable medium comprising program code for causing a computer to perform an image processing method comprising:
- determining an abscissa and an ordinate of a reference control point and a reference slope of a curve passing the reference control point according to an image of different tissue sites and/or different orientations depending upon one or more practical requirements;
- calculating an average value of pixels in an area of interest in the image and using the average value as a current image feature value;
- constructing an S-shaped reference tone scale curve equation by using the coordinates of the reference control point and the reference slope;
- substituting coordinates of a new control point and a slope of a curve passing the new control point into the S-shaped reference tone scale curve equation to calculate parameters therein, so as to obtain the adaptive image tone scale curve; and
- transforming the image using the image tone scale curve for display on a display device,
- wherein an abscissa of the new control point is the image feature value multiplied by a coefficient greater than zero, an ordinate of the new control point is the ordinate of the reference control point, and the slope of the curve passing the new control point is the reference slope multiplied by a ratio of the abscissa of the reference control point to the image feature value.

* * * * *